US012516268B2

(12) United States Patent
Catchmark et al.

(10) Patent No.: US 12,516,268 B2
(45) Date of Patent: Jan. 6, 2026

(54) MULTI-SURFACTANT SYSTEM ELECTROSTATICALLY COUPLED TO A CELLULOSE NANOCRYSTAL COMPRISING A CETRIMONIUM CHLORIDE/FATTY ACID SURFACTANT MIXTURE

(71) Applicant: The Penn State Research Foundation, University Park, PA (US)

(72) Inventors: Jeffrey M. Catchmark, State College, PA (US); Kai Chi, State College, PA (US)

(73) Assignee: The Penn State Research Foundation, University Park (PA)

( * ) Notice: Subject to any disclaimer, the term of this patent is extended or adjusted under 35 U.S.C. 154(b) by 0 days.

(21) Appl. No.: 16/750,989

(22) Filed: Jan. 23, 2020

(65) Prior Publication Data

US 2020/0157467 A1 May 21, 2020

Related U.S. Application Data

(63) Continuation of application No. 15/572,129, filed as application No. PCT/US2016/033496 on May 20, 2016, now Pat. No. 10,550,353.

(60) Provisional application No. 62/165,866, filed on May 22, 2015.

(51) Int. Cl.

| | |
|---|---|
| ***C11D 1/62*** | (2006.01) |
| ***C11D 1/04*** | (2006.01) |
| ***C11D 1/40*** | (2006.01) |
| ***C11D 1/50*** | (2006.01) |
| ***C11D 1/52*** | (2006.01) |
| ***C11D 1/83*** | (2006.01) |
| ***C11D 1/835*** | (2006.01) |
| ***C11D 1/86*** | (2006.01) |
| ***C11D 3/22*** | (2006.01) |
| *C11D 1/12* | (2006.01) |
| *C11D 1/74* | (2006.01) |
| *C11D 17/00* | (2006.01) |

(52) U.S. Cl.

CPC .................. *C11D 1/04* (2013.01); *C11D 1/40* (2013.01); *C11D 1/50* (2013.01); *C11D 1/52* (2013.01); *C11D 1/83* (2013.01); *C11D 1/835* (2013.01); *C11D 1/86* (2013.01); *C11D 3/222* (2013.01); *C11D 1/12* (2013.01); *C11D 1/528* (2013.01); *C11D 1/62* (2013.01); *C11D 1/74* (2013.01); *C11D 17/0008* (2013.01); *C11D 17/0039* (2013.01)

(58) Field of Classification Search

CPC .... C11D 1/62; C11D 1/65; C11D 1/04; C11D 3/222; C11D 17/0008; C11D 17/0039

See application file for complete search history.

(56) References Cited

U.S. PATENT DOCUMENTS

| | | | | | |
|---|---|---|---|---|---|
| 4,622,173 | A | 11/1986 | Broze et al. | | |
| 4,758,467 | A * | 7/1988 | Lempriere | A61K 8/0208 | 427/430.1 |
| 5,472,455 | A | 12/1995 | Mehreteab et al. | | |
| 5,833,764 | A * | 11/1998 | Rader | C11D 1/65 | 134/40 |
| 5,888,488 | A * | 3/1999 | Fukuchi | A61Q 5/12 | 424/70.28 |
| 6,486,245 | B1 | 11/2002 | Thinemann et al. | | |
| 7,442,674 | B2 * | 10/2008 | Polonka | C11D 3/3707 | 510/424 |
| 8,211,414 | B2 | 7/2012 | Chen et al. | | |
| 8,367,048 | B2 * | 2/2013 | Wells | A61K 8/463 | 424/70.28 |
| 8,388,986 | B2 * | 3/2013 | Urgell Beltran | A61Q 19/00 | 424/401 |
| 8,680,031 | B1 | 3/2014 | Poli | | |
| 9,284,265 | B1 * | 3/2016 | Ghare | C07C 235/86 | |
| 2005/0031570 | A1 * | 2/2005 | Grit | A61K 8/68 | 424/70.31 |
| 2008/0311067 | A1 * | 12/2008 | Murray | A61Q 5/12 | 424/70.27 |
| 2009/0137432 | A1 | 5/2009 | Sullivan et al. | | |
| 2010/0324137 | A1 * | 12/2010 | Coughlin | A01N 47/44 | 514/551 |

(Continued)

OTHER PUBLICATIONS

Bondeson et al., "Optimization of the isolation of nanocrystals from microcrystalline cellulose by acid hydrolysis," Cellulose, 13(2):171-80, Apr. 2006.

(Continued)

*Primary Examiner* — Charles I Boyer

(74) *Attorney, Agent, or Firm* — Fish & Richardson P.C.

(57) ABSTRACT

Multi-surfactant systems where two or more surfactant molecules are coupled to control the spatial distribution of polar groups of the combined surfactant molecules are disclosed. The system can be implemented by an aqueous medium including an associate charge constant surfactant and charge variable surfactant. The charge variable surfactant has at least one neutral end group at one pH value of the medium and at least one either an anionic polar group or a cationic polar group at a different pH value of the medium. The charge constant surfactant has at least one, and preferably two or more groups that does not change charge at the one or different pH values of the aqueous medium. The multi-surfactant system can be coupled or connected to the surface of a substrate where the arrangement of the two or more coupled surfactant molecules control the polarity of the substrate surface.

11 Claims, 6 Drawing Sheets

(56) References Cited

U.S. PATENT DOCUMENTS

| | | | | |
|---|---|---|---|---|
| 2011/0224270 | A1* | 9/2011 | Diehl | A01N 43/80 514/372 |
| 2011/0232004 | A1* | 9/2011 | Meine | C11D 17/041 510/330 |
| 2011/0311592 | A1 | 12/2011 | Birbara | |
| 2012/0308624 | A1* | 12/2012 | Isogai | A61K 8/345 424/401 |
| 2013/0053422 | A1* | 2/2013 | Edmonds | A61P 31/02 514/372 |
| 2013/0116340 | A1* | 5/2013 | Furukawa | A61K 8/892 556/449 |
| 2014/0037816 | A1* | 2/2014 | Bakeev | A61K 8/731 426/654 |
| 2014/0134125 | A1* | 5/2014 | Dahl | C09K 23/54 514/777 |
| 2014/0141971 | A1* | 5/2014 | Becker | C11D 3/38672 504/100 |
| 2015/0147802 | A1* | 5/2015 | Nishio | C11D 11/0041 510/161 |
| 2015/0196480 | A1* | 7/2015 | Giuliani | C08G 63/668 424/78.03 |
| 2017/0002297 | A1* | 1/2017 | Klug | C11D 1/655 |
| 2019/0045789 | A1* | 2/2019 | Daigle | A23B 7/154 |

OTHER PUBLICATIONS

International Preliminary Report on Patentability issued in Application No. PCT/US2016/033496 dated Dec. 7, 2017.

International Search Report issued in corresponding International Application No. PCT/US2016/033496, dated Aug. 23. 2016.

Moon et al., "Cellulose nanomaterials review: structure, properties and nanocomposites," Chem. Soc. Rev., 40(7):3941-3994, 2011.

Piispanen, "Synthesis and characterization of surfactants based on natural products," Thesis. KTH Royal institute of Tech. Stockholm {May 2002) [online] [retrieved on Jul. 27, 2016]. Retrieved from the Internet <URL: http://www.divaportal. org/smash/get/diva2:9177/FULL TEXT01.pdf> entire document, especially p. 28.

Wikipedia, "Surlactant" { May 18, 2015) [online] [retrieved on Jul. 27, 2016) _ Retrieved from the Internet <URL: https://en.wikipedia.org/w/index.php?title=Surlactant&oldid=662889773> entire document, especially p. 2-3.

* cited by examiner (a) (b)

MULTI-SURFACTANT SYSTEM ELECTROSTATICALLY COUPLED TO A CELLULOSE NANOCRYSTAL COMPRISING A CETRIMONIUM CHLORIDE/FATTY ACID SURFACTANT MIXTURE

CROSS-REFERENCE TO RELATED APPLICATIONS

This application is a continuation of U.S. application Ser. No. 15/572,129, filed Nov. 6, 2017, which is a U.S. National Phase under 35 U.S.C. § 371 of International Application No. PCT/US2016/033496, filed on May 20, 2016, which claims the benefit of U.S. Provisional Application No. 62/165,866 filed May 22, 2015, the entire disclosure of which is hereby incorporated by reference herein.

STATEMENT REGARDING FEDERALLY SPONSORED RESEARCH

This invention was made with government support under Contract No. 11-JV-11111129-121, awarded by the United States Department of Agriculture, and by the United States Department of Agriculture and under Hatch Act Project No. 4436. The Government has certain rights in the invention.

BACKGROUND

Surfactants are amphiphilic molecules which generally contain a hydrophilic and hydrophobic domain. Four classifications of surfactants exist based on the nature of the hydrophilic group including: 1) nonionic (neutral charge); 2) anionic (negative charge); 3) cationic (positive charge); and 4) amphoteric or zwitterionic where both a positively and negatively charged group are positioned typically in close proximity at the hydrophilic end. Charged groups on surfactants can be characterized by their pKa. When molecules are suspended in solutions which have solution pH at the pKa of the group, the group is neutral. At solution pH values above the pKa, the group is negatively charged; while at solution pH values below the pKa, the group is positively charged.

Examples of surfactants are soaps (typically sodium stearate, comprising about 50% of the yearly production of surfactants, about 15 million tons/year) which are able to exist in aqueous media through the formation of micelles where the hydrophobic and hydrophilic ends of the molecules align and form a generally spherical construct where the hydrophobic ends are located in the interior and exclude water. Importantly, micelles are dynamic structures which can be disrupted via mechanical processes like shear though agitation or extrusion then reform creating stable suspensions. Surfactants can coat materials of different phases to create what are known as emulsions.

Surfactants can be natural or synthetic. Synthetic surfactants include but are not limited to diacetyl tartrate esters of monoglycerides [DATEM], acetylated monoglyceride [AcMG], lactylated monoglyceride [LacMG], and propylene glycol monoester [PGME]), sorbitan derivatives (e.g., sorbitan monostearate, sorbitan monooleate and sorbitan tristearate), polyhydric emulsifiers (e.g., sucrose esters and poly glycerol esters like polyoxyethylene (20) sorbitan monostearate [Polysorbate 60], polyoxyethylene (20) sorbitan tristearate [Polysorbate 65], and poly glycerol monostearate.

Natural surfactants include lipopeptides and lipoproteins, glycolipids, phospholipids, fatty acids and polymeric surfactants. Many can be used in food production. Some specific examples of anionic fatty acid food surfactants include caprylic acid, capric acid, lauric acid, myristic acid, palmitic acid and stearic acid. A specific example of a cationic food surfactant is lauric arginate which also has anti-microbial properties.

Natural, biologically derived food surfactants have an advantage, as they are environmentally friendly, edible and generally safe in virtually any application. Those already used in food production also have the advantage of being readily available in volume quantities and generally low in cost.

There are many applications of surfactants, including detergents, fabric softeners, emulsions, paints, adhesives, inks, waxes, de-inking of recycled papers, enzymatic processes, laxatives, agrochemical formulations, some herbicides and insecticides, pollution remediation, stabilization of nanomaterials such as quantum dots, biocides and sanitizers, cosmetics, shampoos, hair conditioners, toothpastes, pharmaceuticals, drug delivery, food compositions, some spermicides, liquid drag reducing agents for pipelines, oil recovery, and many others. The many diverse applications of surfactants arise from the important function they can perform: compatibilizing an interface between a polar material and non-polar material.

Multi-surfactant compositions have been implemented previously. Broze et al. (U.S. Pat. No. 4,622,173) demonstrated improved liquid laundry detergents containing three surfactants. Specifically Broze, et al. related to laundry detergents with improved detergency obtained from a mixture of an acid-terminated non-ionic surfactant with a quaternary ammonium salt surfactant. Mehreteab et al. (U.S. Pat. No. 5,472,455) used mixtures of anionic and cationic surfactants to improve the removal of oily stains from fabrics. Thunemann et al. (U.S. Pat. No. 6,486,245) disclosed a coating composition based on a complex of polyelectrolytes and oppositely charged surfactants. The surfactants contain fluorine bonded covalently to carbon atoms. The coating material imparts oleophobic and/or hydrophobic properties to various surfaces. However, the multi-surfactant systems disclosed in these patents are not engineered to respond or change dynamically to the environment in which they are used, i.e., change in the degree of polarity of the surfactant system or change the size or structure of any formed micelles as a result of changes in ionic strength or solution pH.

Chen et al. (U.S. Pat. No. 8,211,414) disclosed water soluble polymer complexes with surfactants. Specifically they disclosed complexes including a polymer and a surfactant formed by polymerizing a monomer mixture containing: (A) acid functional monomers at least partially neutralized with one or more amines according to one or more of formulas (I) through (IV): $R_1—NR_2R_3$ (I) $R_1—N^+R_2R_3R_7X^-$ (II) $R_4—C(O)—NR_5—R_6—NR_2R_3$ (III) $R_4—C(O)—NR_5—R_6—N{+}R_2R_3R_7X^-$ (IV) where $R_1$ and $R_4$ are independently $C_8$-$C_{24}$ linear, branched or cyclic alkyl, aryl, alkenyl, aralkyl or aralkyl; $R_2$, $R_3$ and $R_5$ are independently H or $C_1$-$C_6$ linear, branched or cyclic alkyl; $R_6$ is $C_1$-$C_{24}$ linear, branched or cyclic alkylene, arylene, alkenylene, aralkylene or aralkylene, $R_7$ is H, $C_1$-$C_{12}$ linear, branched or cyclic alkylene, arylene, alkenylene, aralkylene or aralkylene, and X is a halide, a sulfate or a sulfonate; (B) one or more cationic monomers; and optionally (C) one or more other monomers. Although a polymer-surfactant complex was formed, the properties or behavior of the complex or surfactant were not engineered to respond to or change dynamically to the environment in which they are used.

In addition, dispersion of cellulose nanoparticles in non-polar matrices using a variety of surfactants has been explored previously, and a few results involve biologically based surfactants. In these cases, however, the surfactant was passive and either simply adsorbed onto the surface through, for example, electrostatic interactions, or covalently coupled to the surface via a crosslinking chemistry.

Accordingly, a continuing need exists for active, environmentally responsive multi-surfactant systems and for compatibilizing disparate materials particularly at the interface thereof.

SUMMARY OF THE DISCLOSURE

An advantage of the present invention is a multi-surfactant system that can dynamically adapt to enhance the compatibility of the interface between two materials.

These and other advantages are satisfied, at least in part, by an aqueous medium comprising a multi-surfactant system in which a charge constant surfactant and a charge variable surfactant are associated. Advantageously, the charge variable surfactant has at least one neutral end group at one pH value of the medium and at least one either an anionic polar group or a cationic polar group at a different pH value of the medium. The charge constant surfactant has at least one, e.g., two or more, groups that do not change charge at the one or different pH values of the aqueous medium.

In some embodiments, the charge constant surfactant has at least one, and preferably two or more, cationic polar end groups and the charge variable surfactant has at least one neutral end group at the one pH, and at least one anionic polar end group at the different pH. Cationic charge constant surfactants that can be used for the present system include benzalkonium chloride, cetrimonium bromide, distearyldimethylammonium chloride, lauryl methyl gluceth-10 hydroxypropyl dimonium chloride, alkylbenzene ammonium chloride, cetylmethyl morpholinium, and trimethylhexadecyl ammonium chloride. Cationic charge constant surfactants having two or more cationic groups that can be used for the present system can be selected from lauric arginate. A surfactant containing an carboxylic acid and a positively charged group, or two carboxylic acid groups, can be made to have two positive groups by reacting the acid with ammonia or diamine, i.e., ethylene diamine, or diethylene triamine. An anionic surfactant containing two negatively charged groups is octyliminodipropionate. A zwitterionic surfactant containing a carboxylic acid and a positively charged group is laurel betaine.

In other embodiments, the charge constant surfactant has at least one, and preferably two or more, anionic polar end group and the charge variable surfactant has at least one neutral end group at the one pH, and at least one cationic polar end group at the different pH. Anionic charge constant surfactants that can be used for the present system include lauryl sulfate, ammonium perfluorononanoate, sodium dodecyl sulfate, sodium dodecylbenzenesulfonate, sodium laurate, sodium laureth sulfate and sodium stearate. Anionic charge constant surfactants having two or more anionic groups that can be used for the present system can be selected from octyliminodipropionate in certain embodiments, the charge variable surfactants include a fatty acid such as butyric acid, caproic acid, caprylic acid, capric acid, lauric acid, myristic acid, palmitic acid, palmitoleic acid, stearic acid, oleic acid, ricinoleic acid, vaccenic acid, linoleic acid, alpha-linolenic acid, gamma-linolenic acid, arachidic acid, gadoleic acid, arachidonic acid, behenic acid, erucic acid, and lignoceric acid. The system can be formed by a molar ratio between the charge constant surfactant and the charge variable surfactant at about 1:1.

Another aspect of the present includes a composition comprising the multi-surfactant system on a substrate. Substrates useful for the present disclosure include polysaccharides, inorganic materials such as metals and ceramics.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

Figure 1:
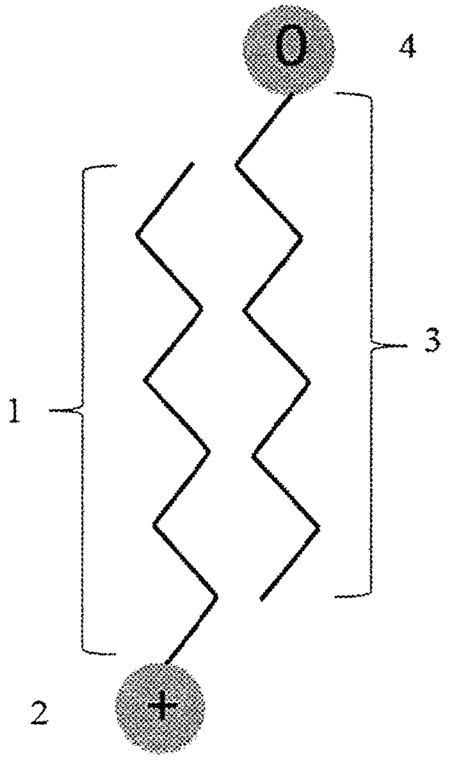
FIG. 1: Illustration of a dual surfactant system where one surfactant has a neutral charge.

Compatibilization of the interface between two materials of differing polarity is one of the most fundamental problems in material science. Surfactants are used extensively in countless commercial products to solve this particular problem. Surfactants are amphiphilic molecules which generally contain a hydrophilic and hydrophobic domain, and as such position themselves in between the two material phases where the polar region of the surfactant aligns with the polar material and the non-polar region of the surfactant aligns with the non-polar material.

In some cases, however, a material may need to be compatible with two or more materials of differing polarity (generally polar and non-polar) at different times. Individual surfactants are not able to dynamically change their polarity to accommodate such situations.

In an aspect of the present disclosure, an aqueous medium includes a multi-surfactant system in which a charge constant surfactant and a charge variable surfactant are associated. The association can be achieved through an electrostatic bond including a bond formed between two oppositely charged molecules or regions on molecules such as end groups, or through ionic bonds where a divalent or trivalent ion is involved. The charge variable surfactant has at least one neutral end group at one pH value of the medium and at least one either an anionic polar group or a cationic polar group at a different pH value of the medium. The charge constant surfactant has at least one, e.g., two or more, groups that do not change charge at the one or different pH values of the aqueous medium.

In some embodiments, the charge constant surfactant has at least one, and preferably two or more, cationic polar end groups and the charge variable surfactant has at least one neutral end group at the one pH, and at least one anionic polar end group at the different pH. Cationic charge constant surfactants that can be used for the present system include benzalkonium chloride, cetrimonium bromide, distearyldimethylammonium chloride, lauryl methyl gluceth-10 hydroxypropyl dimonium chloride, alkylbenzene ammonium chloride, cetylmethyl morpholinium, and trimethylhexadecyl ammonium chloride. Cationic charge constant surfactants having two or more cationic groups that can be used for the present system can be lauric arginate or be created by taking a surfactant containing an carboxylic acid and a positively charged group, or two carboxylic acid groups, and reacting the acid with ammonia or diamine, i.e., ethylene diamine, or diethylene triamine. An anionic surfactant containing two negatively charged groups is octyliminodipropionate. A zwitterionic surfactant containing a carboxylic acid and a positively charged group is lauryl betaine. In other embodiments, the charge constant surfactant has at least one, and preferably two or more, anionic polar end group and the charge variable surfactant has at least one neutral end group at the one pH, and at least one cationic polar end group at the different pH. Anionic charge constant surfactants that can be used for the present system include lauryl sulfate, ammonium perfluorononanoate, sodium dodecyl sulfate, sodium dodecylbenzenesulfonate, sodium laurate, sodium laureth sulfate, sodium stearate and fatty acids such as butyric acid, caproic acid, caprylic acid, capric acid, lauric acid, myristic acid, palmitic acid, palmitoleic acid, stearic acid, oleic acid, ricinoleic acid, vaccenic acid, linoleic acid, alpha-linolenic acid, gamma-linolenic acid, arachidic acid, gadoleic acid, arachidonic acid, behenic acid, erucic acid, and lignoceric acid. Anionic charge constant surfactants having two or more anionic groups that can be used for the present system can be selected from octyliminodipropionate. The system can be formed by a molar ratio between the charge constant surfactant and the charge variable surfactant at about 1:1.

In an embodiment, multi-surfactant compositions are disclosed that contain two or more coupled surfactants in a complex. The polarity of the complex can depend upon the solution pH. Also disclosed is a composite material comprising the two or more surfactants and a substrate where a surface of the substrate is at least partially coated with two or more surfactants, where the surfactants are in the form of a coupled complex, and where the polarity of the surface of the substrate is determined by the pH of the solution in which the surfactant coated substrate is submerged.

Another aspect of the present disclosure includes a composition comprising the multi-surfactant system on a substrate. The multi-surfactant-substrate binding mechanism can be based on hydrophobic interactions, electrostatic interactions, ionic interactions, van der Waals interactions, or through some covalent linkage formed between at least one surfactant molecule and the substrate.

The substrate can be in the form of a particle, fiber, sheet, flake, foam, plate, aggregate, or previously formed composite and range in size where at least one dimension is approximately 1 nm to 1 meter or more. The substrate can be natural such as a polysaccharide, a nanofiber of cellulose, or particle of starch, or be synthetic such as a carbon nanotube fiber, C60 particle, or polyethylene in the form of a particle, fiber or sheet. The substrate can also be a composite, natural or synthetic, such as wood or a blend of cellulose and polyethylene or poly lactic acid.

Additional substrates useful for practicing the present disclosure include a polysaccharide, e.g., a starch, cationic starch, anionic starch, potato starch, pectin, carrageenan, alginate, xanthan gum, carboxymethyl cellulose, cellulose, or cellulose nanocrystal, e.g., a nanodimensional cellulose where at least one dimension of the cellulose particle is less than 100 nm. Inorganic material can also be used as substrates such as kaolinite, nacrite, dickite, halloysite, bentonite, montmorillonite, saponite, hectorite, beidellite, calcium carbonate, or calcium phosphate. A metal or metal composite can be used as a substrate such as gold, silver, steel, stainless steel, platinum, bronze, brass, copper, nickel, tin, zinc, aluminum or mercury; and a ceramic can be used as a substrate such as silicon dioxide, aluminum oxide, zirconium oxide, titanium diboride, boron carbide, silicon carbide, tungsten carbide, boron nitride or silicon nitride.

In some cases, the multi-surfactant substrate composite can be created to respond to an environmental condition such as solution pH, ionic concentration, temperature, or liquid shear forces where the response is a change in the substrate surface polarity.

In some cases, the solubility of the multi-surfactant-substrate composite can be changed by changing an environmental parameter such as solution pH, ionic concentration, temperature, or exposure to liquid shear forces due to vigorous blending. In this case, for example, the substrate may be soluble and suspended in a solution and then an environmental condition is changed such as solution pH, ionic concentration, temperature, or liquid shear forces, and the substrate precipitates out of solution as a result of a change in surface polarity, allowing the substrate to be more easily separated from the solution. Precipitation may also impact other properties of the solution such as viscosity.

In some cases, the change in polarity of the surface of the substrate can compatibilize the substrate for incorporation into another material such as a material which exhibits a polarity differing from that of the substrate.

In some cases, the coupled multi-surfactant complex can form a micelle where the structure of the micelle, such as the size of the micelle, can be changed by changing an environmental parameter such as solution pH, ionic concentration, temperature, or liquid shear forces. Alternatively, a micelle formed by the coupled multi-surfactant complex may either form or cease to exist based on an environmental parameter such as solution pH, ionic concentration, temperature, or liquid shear forces. This may be useful for applications where a micelle is used as a material delivery device where the interior of the micelle contains a material which would be delivered to the environmental solution if the micelle was disrupted.

In one aspect of the disclosure, a multi-surfactant system comprising two or more coupled or associated surfactants are disclosed where the nature of the polarity of the combined surfactants changes based on an environmental condition such as solution pH, ionic concentration, temperature, or fluid shear forces.

In another aspect of this invention, the multi-surfactant system is coupled to a substrate surface to allow that substrate surface to be compatible with either a polar or non-polar material at different times depending upon an environmental parameter such as pH, ionic concentration, temperature, or fluid shear forces.

The four stated environmental parameters can impact the characteristics of a given surfactant or surfactant system. Solution pH changes the charge on the surfactant end groups. Ionic strength can shield or compensate charges changing the net charge of surfactant chemical groups. Temperature can change the solubility of a surfactant. And fluid shear forces can separate surfactant complexes (such as micelles) and isolate surfactants, which can reform when the shear force has been removed.

Figure 2:
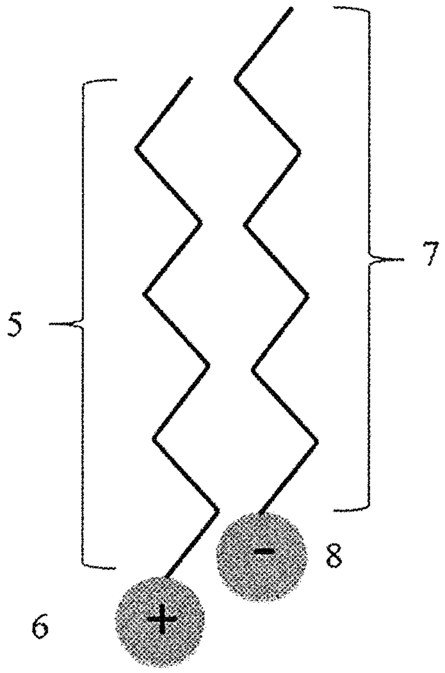
FIG. 2: Illustration of a dual surfactant system where one surfactant has an anionic charge.

A multi-surfactant system whose polarity is sensitive to pH is shown in FIGS. 1 and 2. In these figures, a charge constant surfactant (cationic) is complexed with a charge variable surfactant in an aqueous medium, e.g. an aqueous solution. In FIG. 1, the charge constant surfactant includes a generally non-polar hydrophobic tail (1) often composed of a hydrocarbon chain, which can be branched, linear, or aromatic. The tail can also be a fluorocarbon. An example of a linear hydrocarbon is an alkane chain. In this example, the generally polar head (2) of the charge constant surfactant in FIG. 1 is cationic, making the charge constant surfactant a cationic surfactant. The cationic group can be an amine group or a quaternary ammonium cation. The surfactant system shown in FIG. 1 also contains a second surfactant, i.e., a charge variable surfactant, which includes a generally non-polar hydrophobic tail (3) and another polar head (4) which is anionic or neutral based on the pH of the solution for this example. The anionic group can be a carboxylic acid group. In FIG. 1 the polar group (4) is shown to be neutral representing the neutral charge of the group at a solution pH which is at or near the pKa of the polar group (4), i.e., the pH which makes the charge of the polar group (4) neutral. The representation of the surfactant system in FIG. 1 is at a pH where the polar group (2) is cationic and the polar group (4) is neutral. In this case, the charge constant and charge variable surfactants will arrange to minimize the energy of the system and orient as shown where the polar groups are located at either end of the complex to minimize the hydrophobic surface. This would make the system more soluble in a polar solution.

In FIG. 2, the same two surfactants are shown as in FIG. 1 but the system is illustrated at a different pH where the pH still allows the cationic group to remain cationic but where the neutral group has become anionic. The charge constant surfactant includes a non-polar hydrophobic tail (5) and a cationic polar hydrophilic head group (6) whereas the charge variable surfactant includes a non-polar hydrophobic tail (7) and an anionic polar hydrophilic head group (8). At this pH, the group (8) is anionic. Since electrostatic forces are stronger, longer-range forces in comparison to hydrophilic/hydrophobic forces, the molecules will rearrange in the polar media to satisfy the charges, i.e., the negative charge will be attracted to the positive charge. This rearrangement of the surfactant molecules will result in a 2-surfactant complex where the complex now has a polar head comprising groups (6) and (8) and a non-polar tail region comprising tails (5) and (7). The complex would resemble a typical individual surfactant molecule and only be soluble in micelle form if the concentration is above the critical micelle concentration.

Figure 8:
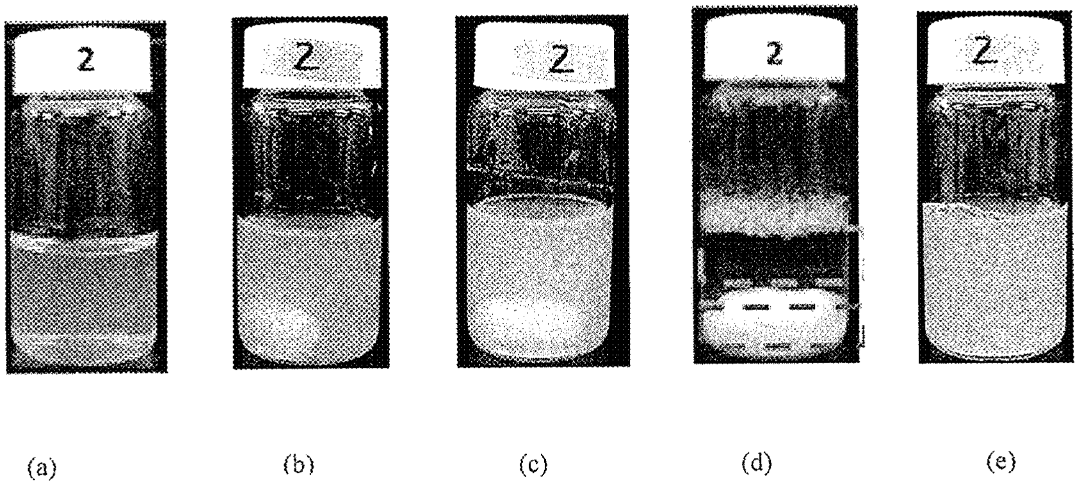
FIG. 8 is a picture of several vials including: (a) 1 mg/ml solution of CNCs at a pH of 4; (b) 1 mg/ml CNC+2.5 mg/ml of LAE at pH 4; (c) 1 mg/ml CNC+2.5 mg/ml of LAE+2.5 mg/ml LA at pH 4; (d) CNC+LAE+LA adjusted to pH 6 (blue dashed box show supernatant and green dashed box show precipitant analyzed by SEM as shown in FIG. 8); (e) CNC+LAE+LA solution adjusted back to pH 4. The white cylindrical object at the bottom of the container shown in (b), (c) and (d) is a stir bar.

The system shown in FIGS. 1 and 2 is sensitive to pH and switching of the 2 configurations of the system can be achieved by changing the pH which changes the charge state of the cationic/neutral group (4 in FIGS. 1 and 8 in FIG. 2). This system would also be sensitive to ionic strength, temperature, or shear. As shown in FIGS. 1 and 2, the molar ratio of the surfactants is 1:1.

In the case where the surfactant system exhibits a conformation similar to an individual surfactant as shown in FIG. 2, the system would form micelles when the concentration is above the critical micelle concentration. By changing the pH such that the polar ends are not localized at one end of the complex as shown in FIG. 1, the formed micelle can be disrupted. If the micelle contained a material, that material would then be exposed to the medium, e.g., the solution. This allows the complex to become a part of a chemical delivery device sensitive to pH or other factors such as ionic strength, temperature or shear.

In the case where the surfactant system is in the configuration shown in FIG. 1, the length of the non-polar hydrophobic tails (1) and (3) may impact the solubility of the complex and any other micelle-like formation such a complex may form in solution.

Specific examples of chemical groups which exhibit the behavior described here include a cationic polar head group (2 in FIGS. 1 and 6 in FIG. 2) comprising an amine (pKa of about 10) and a neutral/anionic polar head group (4 in FIG. 1, shown neutral, and 8 in FIG. 2, shown anionic) comprising a carboxylic acid (pKa of about 4). In this situation, the configuration shown in FIG. 1 would exist at a pH of 4 while the configuration shown in FIG. 2 would exist at a pH of about 6.

Figure 3:
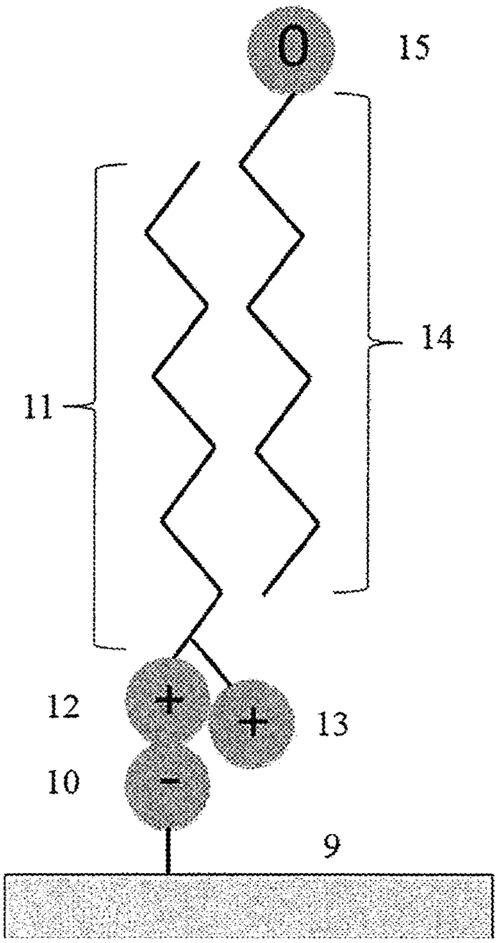
FIG. 3: Illustration of a dual surfactant system associated with a substrate where one surfactant has a neutral charge.
Figure 4:
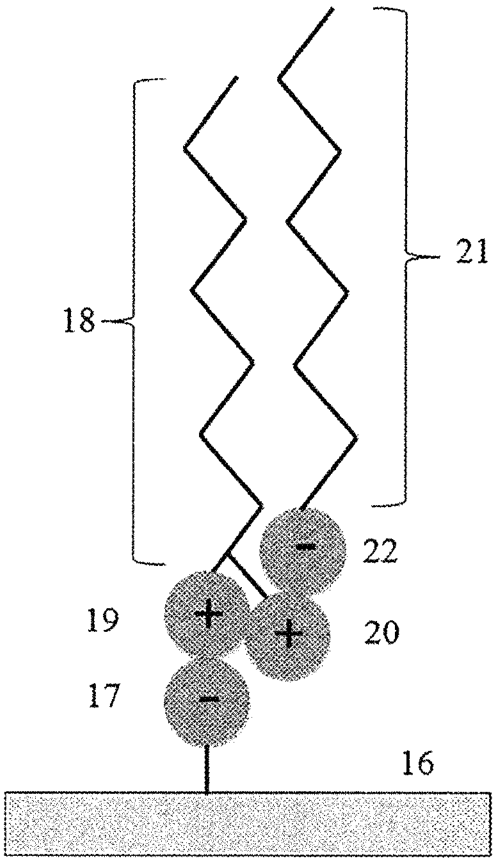
FIG. 4: Illustration of a dual surfactant system associated with a substrate where one surfactant has an anionic charge.

A different surfactant system attached to an anionic substrate surface where the polarity of the surface is sensitive to pH is shown in FIGS. 3 and 4. This surface polarity would also be sensitive to ionic strength, temperature, and shear. In FIG. 3, a substrate (9) with anionic groups (10) would attract a charge constant cationic surfactant. In this example, the charge constant cationic surfactant comprises a non-polar hydrophobic tail (11) and two polar hydrophilic cationic head groups (12 and 13). For this system, the charge variable surfactant associated with the charge constant surfactant includes a non-polar hydrophobic tail (14) and a neutral polar hydrophilic head group (15) at a pH where the group (15) is neutral. FIG. 4 depicts the system when the pH has been changed such that the polar group (15) of the charge variable surfactant in FIG. 3 has become anionic. In FIG. 4, the substrate (16) exhibits anionic groups (17) that attract the cationic groups (19 and 20) of the charge constant surfactant with non-polar tail (18). In this case, however, the anionic group (22) of charge variable surfactant which also contains a non-polar tail (21), is attracted to the cationic groups (19 or 20), resulting in a change in the conformation of the surfactant system as compared to that shown in FIG. 3 where the non-polar hydrophobic tails (18) of the charge constant surfactant and the charge variable surfactant (21) are now positioned away from the surface of substrate (16) rendering the surface of substrate (16) hydrophobic. The two cationic charges (19 and 20) on the charge constant surfactant are preferable as one charge satisfies the anionic charge (17) on the substrate and the other attracts the anionic charge (22) of the charge variable surfactant to rearrange the surfactants from the configuration shown in FIG. 3 to that shown in FIG. 4 for different solution pH values.

Specific examples of chemical groups which exhibit the behavior described here include an anionic substrate group (10 in FIGS. 3 and 17 in FIG. 4) which can be a sulfate (pKa of about 1), cationic groups (12 and 13 in FIGS. 3 and 19 and 20 in FIG. 4) which can be amines (pKa about 10), and a neutral/anionic group (15 in FIGS. 3 and 22 in FIG. 4) which can be a carboxylic acid (pKa about 4). In this situation, the configuration shown in FIG. 3 would exist at a pH of 4 while the configuration shown in FIG. 4 would exist at a pH of about 6. At a pH of about 6, the substrate (9 in FIGS. 3 and 16 in FIG. 4) would become hydrophobic. If the substrate was in the form of a suspension in the polar solution, it would be generally soluble at pH 4 but precipitate at pH 6.

Many variations of the system described here exist. For example, the charge constant surfactant shown in FIGS. 3 and 4 can be associated or attached to the substrate by means other than electrostatic interactions. The charge constant surfactant can be attached to the substrate via a covalent bond such as a surfactant containing a silane and a substrate containing hydroxyls. Many other examples exist as known to one skilled in the art. In addition, the pH sensitivity of the systems shown in FIGS. 1-4 could be altered by changing one or more of the polar charged head groups with other groups that exhibit different pKa values. Other differences are also possible by altering the lengths of the non-polar hydrophobic tails or even the geometries of the surfactants, which could be quite complex and contain multiple hydrophobic regions and more than one polar charged region. Other possibilities exist using zwitterionic or amphoteric surfactants where differing charged groups are employed with differing pKa values. Any of the systems described here could also be used in either polar or non-polar mediums or solutions. These and other such extensions are contemplated as part of the disclosure herein.

The aqueous medium comprising the multi-surfactant system of the present disclosure can be used in many applications. For example, the current system can be used to separating highly hydrophilic nanoscale particles or substrates from an aqueous solution or compatibilize the surface of a substrate for incorporation into either polar or non-polar materials.

The current system can be used to engineer food composites which contain non-polar (oils, fats, lipids, proteins, etc.) and polar (polysaccharides, lipids, proteins, etc.) materials allowing different textures, rheology behavior, or other attributes to be engineered. For example, anionic potato starch can be functionalized with the dual surfactant system disclosed here which at one pH would be hydrophilic but at another pH become hydrophobic making the fiber surface compatible with oils and fats.

Another food application of the current invention can be the functionalization of an indigestible material such as cellulose, nanocellulose, carboxymethyl cellulose, pectin, or other polysaccharide where at one pH the material is soluble in an aqueous media but at another pH it becomes hydrophobic and as such will bind oils and fats which in turn may be removed by the body by the indigestible material resulting in reduced calorie intake.

The current system can be implemented using an inorganic material as a substrate such as a clay or mineral (for example: kaolinite, nacrite, dickite, halloysite, bentonite, montmorillonite, saponite, hectorite or beidellite), which in turn could be then incorporated into other composites, or paper substrates (as an additive or coating), where the functionalized clay would then have a pH dependent surface polarity. For papermaking, the functionalized clay could be incorporated into the paper sheet (as an additive or coating) in the hydrophilic state then after the composite sheet is made the sheet can be exposed to a different pH switching the surface of the clay to a hydrophobic state, changing the polarity of the paper. This could be useful in packaging applications or other applications where resistance to aqueous solutions is needed or improved dewatering (lower dewatering time and energy) of the paper is desired.

The current system can be used as a cosmetic compound. For example, polysaccharide fibers, clays or minerals can be functionalized to exhibit different polarities which are sensitive to environmental pH which can be influenced by factors such as body perspiration.

The current system can be used as an environmental remediation agent. For example, functionalized magnetic particle substrates can be introduced into an environment with a polar surface but by changing the pH be made non-polar resulting in the binding of non-polar pollutants such as oils or other non-polar chemical compounds to the magnetic particle. The particles and bound pollutants can be removed using a magnet.

The current system can be used to create a pH dependent delivery vehicle where, without a substrate, such as the system shown in FIGS. 1 and 2, micelles or emulsions can be created from the dual surfactant system at a pH where the complex resembles the configuration shown in FIG. 2. By changing the pH, the micelle or emulsion would be disrupted resulting in the release of the contents.

Embodiment 1

Cellulose extracted from plants has been a cornerstone material used throughout the world for thousands of years and is currently found in countless products such as fiber composites, paper, textiles, cosmetics, healthcare products, and even electronic devices. Crystalline nanocellulose (CNC) is isolated from natural cellulose and a high value component of cellulose as it exhibits exceptional mechanical properties; among the best in both the natural and synthetic polymer worlds.

Much is now known about CNC materials, and both existing and new enabling applications are continuously emerging. See, e.g., Moon et al. Chem. Soc. Rev. 2011:40:3941-3994. Unlike many synthetic polymers, cellulose exhibits a highly hydrophilic surface as surface hydroxyls or sulfate groups (if hydrolyzed using sulfuric acid) strongly bind water through hydrogen bonding. CNCs, being rod-like nanomaterials whose diameter can be as little as about 3-4 nm and length as small as 50-2000 nanometers, exhibit very high surface areas and thus bind high volumes of water and in fact exist in a gel when concentrated to only a few percent. This situation is problematic for practical issues like the costs and energy efficiency of shipping CNCs in hydrated form (the bulk of weight is water) and the cost and energy required for dehydration. In addition, the strong polarity of the CNC surface makes the development of composites with non-polar compounds such as polylactic acid, polyethylene, and other plastics or bioplastics practically impossible without CNC surface modification. Cellulose, CNC, polysaccharides and other relevant material compositions would benefit from ecologically compatible surface functionalizations that enable control over surface polarity.

A specific example of a multi-surfactant system includes a multi-surfactant complex comprising a cationic surfactant and an anionic/neutral surfactant complex coating a polysaccharide such as a cellulose nanofiber where the cellulose nanofiber surface is generally hydrophilic at a pH of roughly 4 and generally hydrophobic at a pH of roughly 6.

For example, the surfactant complex system shown in FIGS. 3 and 4 has been implemented on sulfuric acid hydrolyzed cellulose nanocrystals, which is described in further detail below. Of course, the surfactant system can be implemented on any substrate including micro or millimeter scale cellulose fiber, other polysaccharides, proteins, and inorganic compounds such as metals, minerals and clays. The following is only an example of the implementation of the current system using an anionic organic polysaccharide substrate.

Materials

The cationic surfactant lauric arginate (LAE) ($C_{20}H_{41}N_4O_3Cl$, MW=421.02 g·mol$^{-1}$), a derivative of lauric acid, L-arginate HCl, and ethanol, was provided by A&B ingredients (Fairfield, N.J., U.S.A.). The neutral/anionic surfactant lauric acid (LA) ($C_{12}H_{24}O_2$, MW=200.32 g·mol$^{-1}$, CAS #143077) was purchased from Sigma-Aldrich. Dodecylamine hydrochloride (DDA) ($C_{12}H_{28}ClN$; MW=221.81 g/mol, CAS Number: 929-73-7, Product Number: D1452) was purchased from TCI America. Avicel PH101 microcrystalline cellulose (MCC), used as raw material for the production of cellulose nanocrystals (CNCs), was purchased from Sigma-Aldrich.

Figure 5:
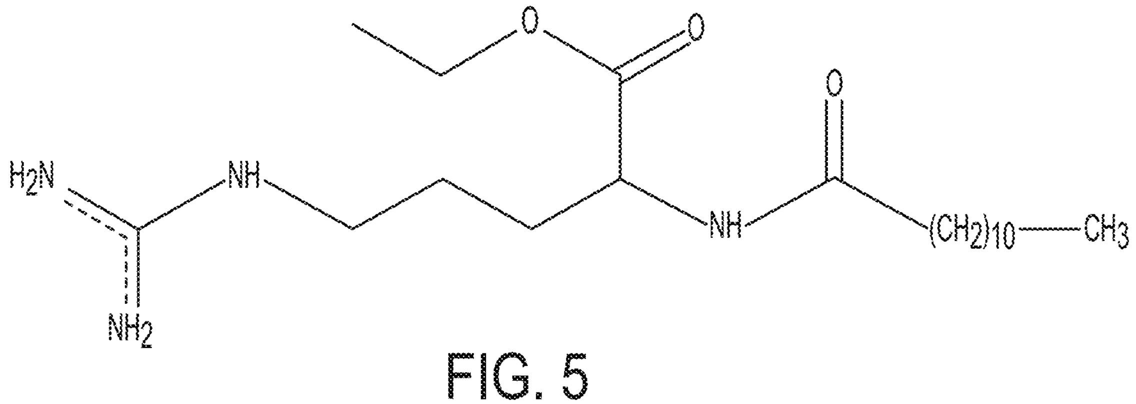
FIG. 5: Structure of lauric arginate (LAE).
Figure 6:
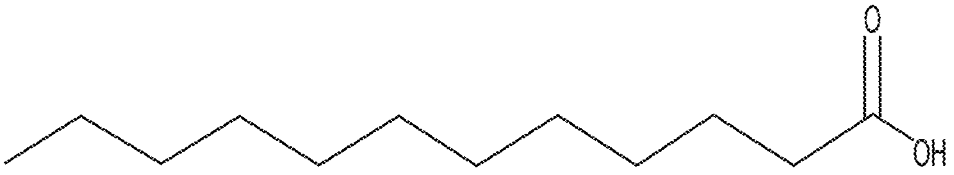
FIG. 6: Structure of lauric acid (LA).
Figure 7:
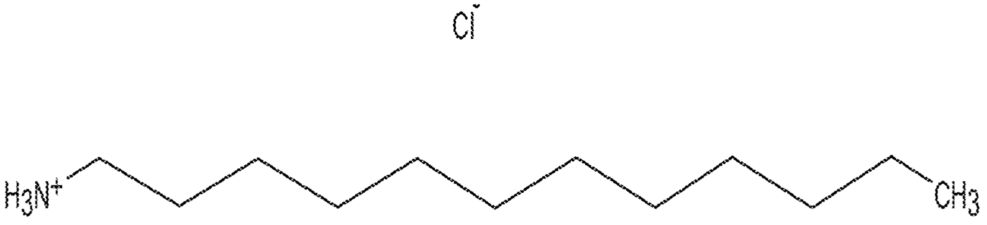
FIG. 7: Structure of Dodecylamine hydrochloride (DDA).

LAE has two (2) amine groups on its polar hydrophilic end, as illustrated in FIGS. 3 and 4 (charge constant surfactant with two cationic groups). LA has one carboxylic acid group on its polar hydrophilic end as shown in FIGS. 3 and 4 (charge variable surfactant, neutral and anionic groups). DDA only has one amine on its polar hydrophilic end. The structures of LAE, LA and DDA are shown in FIGS. 5, 6 and 7, respectively.

Methods

Preparation of CNCs

The method described by Bondeson et al was used to prepare cellulose nanocrystals (CNCs) with some minor modifications. Bondeson et al. Cellulose 2006:13:171-80. Generally, MCC was hydrolyzed with 60 wt % sulfuric acid using an acid-to-cellulose ratio of 10 (ml/g) at a temperature of 45° C. for 90 min. The suspension was then diluted 10-fold to stop the reaction. After that, the suspension was centrifuged, washed once with deionized water, and re-centrifuged. The centrifuge step was repeated at least three times until the supernatant became turbid. The sediment was then collected and dialyzed (3.5K molecular cut off) against deionized water for several days until the pH of the dialysis water became constant. Finally, to remove any aggregates, the suspension was sonicated (Branson Model 5510, Danbury) under ice-bath cooling for 10 min.

Surface Modification of CNCs

The pH of the CNCs suspension (1 mg/ml, 10 ml volume) was adjusted to 4 using NaOH aqueous solution. If the CNC suspension is basic, it can be adjusted to a pH of 4 using formic acid. 1.5 ml LAE stock solution (20 mg/ml) was first added into the CNCs suspension to achieve a 2.5 mg/ml LAE concentration. The LAE/CNCs mixture was kept stirring at 45° C. overnight. Subsequently, LA was added dropwise into the LAE/CNCs mixture to achieve a LAE:LA molar ratio of 1:1. The LAE/LA/CNCs suspension was stirred and heated at 45° C. overnight and the pH was adjusted to 4. To achieve the reversibility of surface polarity from hydrophilic to hydrophobic, the pH of functionalized CNCs suspension was simply changed from 4 to 6 by adding NaOH aqueous solution. All the LAE/LA/CNCs samples were allowed to cool down to room temperature.

Scanning Electron Microscopy Analysis

The supernatants and precipitates of LAE/CNC mixture and LAE/LA/CNC mixture (pH=6) were freeze-dried for the SEM analysis. All samples were coated with radium. A field emission scanning electron microscope (FEI Nova NanoSEM 630) operating at 3-5 KV was used to observe the samples.

Dynamic Light Scattering (DLS) Analysis

The hydrodynamic diameter of pristine and surface modified CNCs were measure by DLS using a Malvern NanoZS instrument. Aqueous suspensions or solutions (1 mg/ml) of different samples were prepared and measured at a temperature of 25 OC with a detection angle of 173°. The intensity size distribution was obtained from the analysis of the correlation function using the multiple narrow mode algorithm of the Malvern DTS software.

Results

Figure 9:
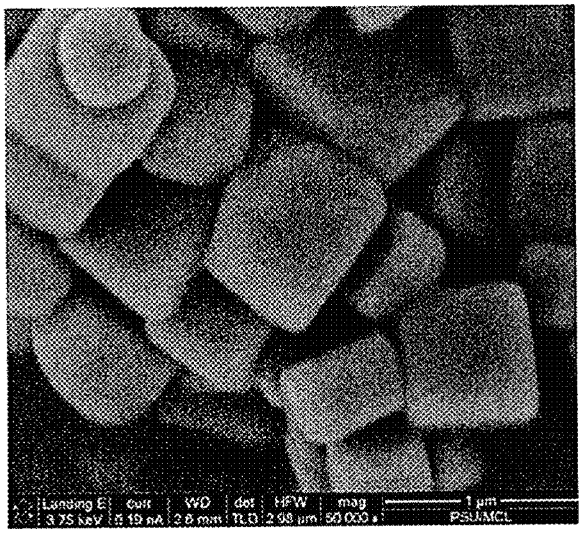
FIG. 9: SEM image of the freeze dried supernatant of the solution shown in FIG. 8*d*. No CNCs are visible. The cubic features are formed from excess LAE–LA.
Figure 10:
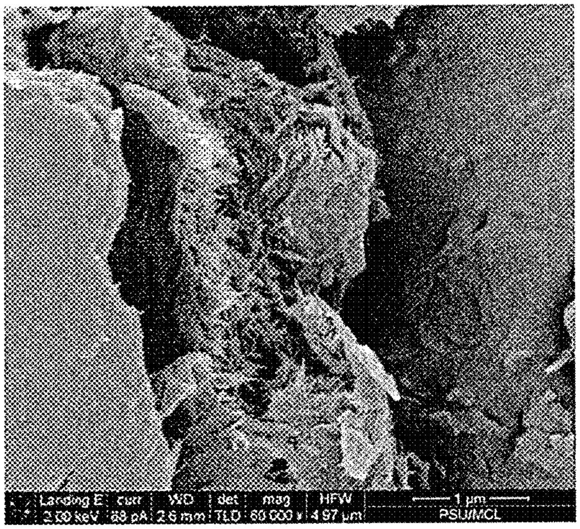
FIG. 10: SEM image of the freeze dried precipitant shown in FIG. 8*d*. Aggregates of CNCs are observed.

FIG. 8 shows one practical implementation of the dual surfactant system described in FIGS. 3 and 4. FIG. 8*a* is a photograph of a 1 mg/ml solution of CNCs at a pH of 4. FIG. 8*b* shows the same solution after the addition of 2.5 mg/ml of LAE at pH 4 as described above. FIG. 8*c* shows the same solution after the addition of 2.5 mg/ml LA at pH 4 as described above. The CNC/LAE/LA material is soluble. FIG. 8*d* shows the same solution after the pH has been adjusted to 6 as described above. The LAE/LA functionalized CNC nanofiber particles precipitate out of solution. FIG. 8*e* shows the same solution after the pH has been readjusted to 4 and mixed. The LAE/LA functionalized CNC nanofiber particles are again soluble in solution. FIG. 9 shows an SEM image of the freeze dried supernatant of the solution shown in FIG. 8*d*. No CNCs are visible. The cubic features are formed by the excess LAE-LA in the supernatant. FIG. 10 shows an SEM image of the freeze dried precipitant shown in FIG. 8*d*. Aggregates of CNCs are observed.

Identical experiments were performed with a cationic surfactant with only one amine. LAE was replaced with dodecylamine hydrochloride (DDA) ($C_{12}H_{28}ClN$; MW: 221.81 g/mol). The behavior described above and shown in FIGS. 8*a-e* could not be reproduced using DDA instead of LAE, demonstrating a preference under certain conditions for 2 cationic end groups in the system illustrated in FIGS. 3 and 4 as described above.

Embodiment 2

Figure 11:
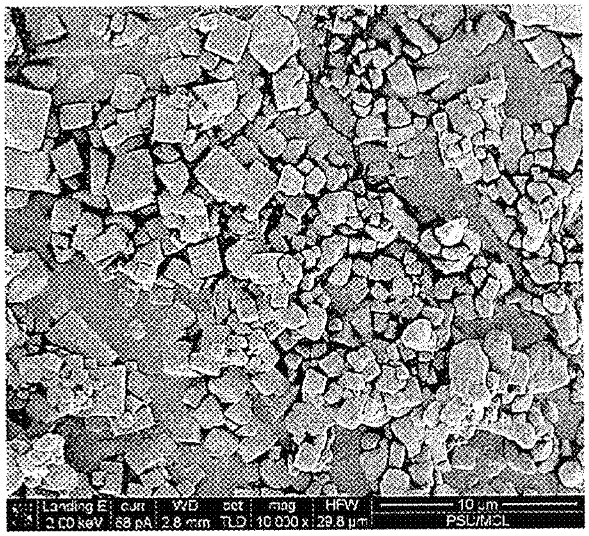
FIG. 11: SEM image of a freeze dried 1:1 LAE:LA suspension adjusted to a of 4 before freeze drying.
Figure 12:
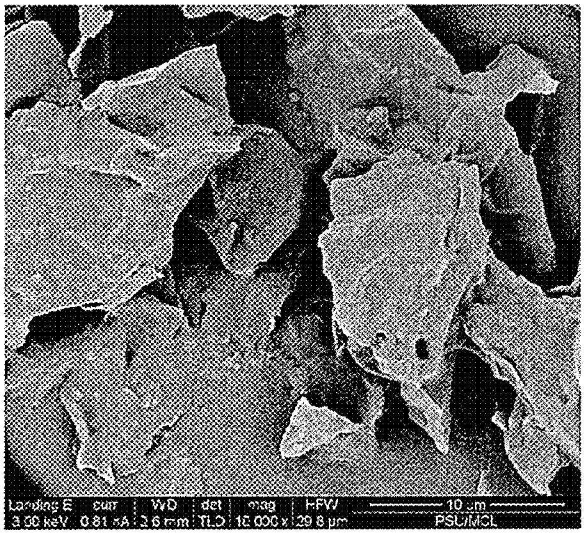
FIG. 12: SEM image of a freeze dried 1:1 LAE:LA suspension adjusted to a pH of 6 before freeze drying.
Figure 13:
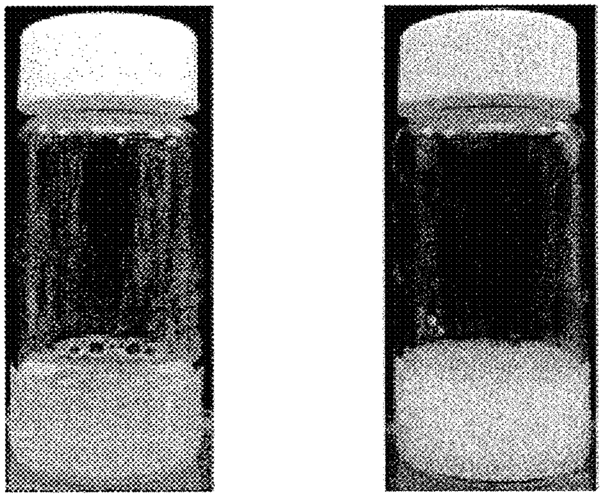
FIG. 13: LAE:LA solutions whose SEM analysis is shown in FIGS. 11 (*a*) and 12 (*b*).

Surfactant molecules can exist in a soluble state when in the form of a micelle. Micelles form when the surfactant concentration is higher than the critical micelle concentration. DLS experiments were performed on LAE (10 mg/ml) pH 4, LAE:LA (10 mg/ml:4.76 mg/ml, 1:1 molar ratio) pH 4 and LAE:LA (10 mg/ml:4.76 mg/ml, 1:1 molar ratio) pH 6 to determine particle size in solution. These concentrations are above the critical micelle concentration. Micelles measuring approximately 309 nm+−12 nm were observed for the LAE solution. At pH 4, the LAE:LA solution contained aggregates which could be in the form of a micelle whose average size was 205 nm+−60 nm, however a large tail in the distribution was observed showing some larger aggregates measuring over 1000 nm. At a pH of 6, the LAE:LA solution exhibited a dramatic increase in the size of the aggregates with a main peak at 3665 nm+−602 nm and a smaller secondary peak at 660 nm+−67 nm. Scanning electron microscopy images of freeze dried LAE:LA suspensions adjusted to a pH of 4 and 6 are shown in FIGS. 11 and 12, respectively. FIGS. 13 (*a*) and (*b*) depicts the corresponding LAE:LA solutions at a pH of 4 and 6, respectively. The behavior is reversible as a function of pH. The concentration of LAE:LA in solution was approximately 4 times higher than that used in embodiment 1. The cubic structure shown in FIG. 11 is known to form for micelles in high concentration which pack to form a cubic-crystal-like structure.

This experiment shows that the structure of the LAE:LA aggregates can be dramatically influenced by pH.

Embodiment 3

Another practical implementation of the dual surfactant system described in FIGS. 3 and 4 includes a polysaccharide whose structure and surface polarity is altered by the presence of the dual surfactant system. For example, kappa carrageenan exists in the form of a double helix at temperatures less than approximately 70 OC but above this temperature exhibit a random coil structure. A modified kappa carrageenan can be created where the formation of the double helix conformation under 70 OC is reduced or prevented. This can be done as follows. Add kappa carrageenan powder to water to form a 0.1% w/w to 2% w/w or more (kappa carrageenan to water) solution and heat to a temperature of 80 OC to 90° C. Adjust the pH of the solution to 4 using a formic acid aqueous solution. Add LAE stock solution (20 mg/ml, pH 4, described above) to the kappa carrageenan solution to achieve a w/w ratio of approximately 5:1 to 1:50 (LAE:kappa carrageenan). Stir the mixture at 80° C. to 90° C. overnight. Subsequently, add LA to achieve an LAE:LA molar ratio of 1:1 in the solution. Check the pH and adjust to 4 using NaOH or formic acid as needed. Stir the LAE/LA/kappa carrageenan suspension at 80° C. to 90° C. overnight. To achieve the reversibility of surface polarity from hydrophilic to hydrophobic, the pH of functionalized kappa carrageenan suspension can be simply changed from 4 to 6 by adding NaOH aqueous solution. This process can be implemented with other anionic polysaccharides, including those which undergo conformational changes as a function of temperature or pH.

What is claimed is:

1. A composition comprising a multi-surfactant system on a substrate, in which the multi-surfactant system comprises:

A) a cationic constant surfactant and

B) a charge variable surfactant, wherein these surfactants are associated in the form of a complex in an aqueous medium, wherein;

i) the charge variable surfactant has at least one neutral end group at one pH value of the medium and at least one anionic polar group at a different pH value of the medium;

ii) the cationic constant surfactant has at least one cationic group that does not change charge at the one or different pH values of the aqueous medium;

iii) the cationic constant surfactant is cetrimonium chloride;

iv) the cationic constant surfactant and charge variable surfactant are at a molar ratio of about 1:1;

v) the cationic constant surfactant is electrostatically coupled to an anionic surface of the substrate, thereby providing said surface with a reversible, pH-dependent surface polarity; and vi) the substrate is a cellulose nanocrystal.

2. The composition of claim 1, wherein the charge variable surfactant is a fatty acid the group consisting of caprylic acid, capric acid, lauric acid, myristic acid, palmitic acid, and stearic acid.

3. The composition of claim 2, wherein said fatty acid is caprylic acid.

4. The composition of claim 2, wherein said fatty acid is capric acid.

5. The composition of claim 2, wherein said fatty acid is lauric acid.

6. The composition of claim 2, wherein said fatty acid is myristic acid.

7. The composition of claim 2, wherein said fatty acid is palmitic acid.

8. The composition of claim 2, wherein said fatty acid is stearic acid.

9. The composition of claim 1, wherein the surface of the cellulose nanocrystal is hydrophilic at the one pH value of the medium and hydrophobic at the different pH value of the medium.

10. The composition of claim 1, wherein the surface of the cellulose nanocrystal is hydrophobic at the one pH value of the medium and hydrophilic at the different pH value of the medium.

11. The composition of claim 1, wherein the polarity of the surface of the cellulose nanocrystal is sensitive to pH.

* * * * *